Figure 5:
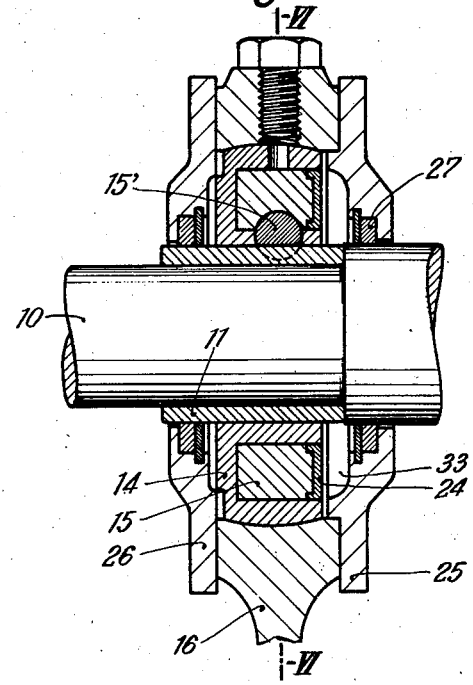

Jan. 1, 1935.    G. BÜHLER    1,986,040
PLAIN BEARING
Filed April 20, 1932    3 Sheets-Sheet 1
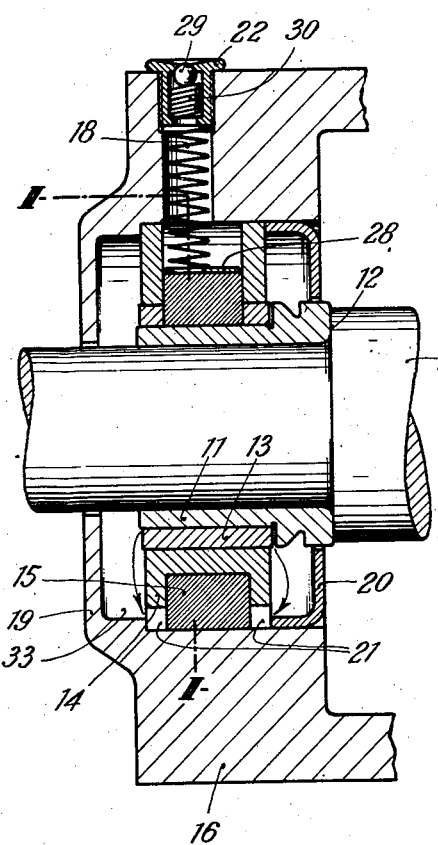
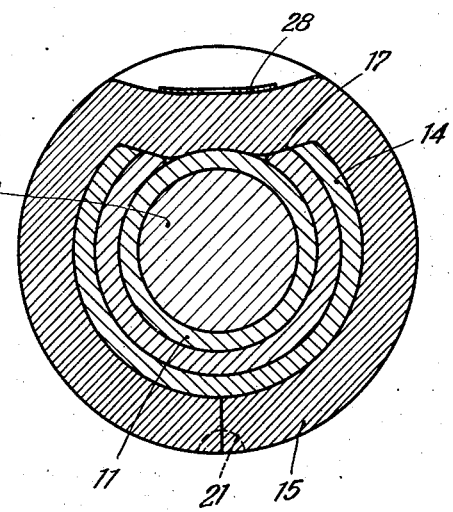

Jan. 1, 1935.   G. BÜHLER   1,986,040
PLAIN BEARING
Filed April 20, 1932    3 Sheets-Sheet 2
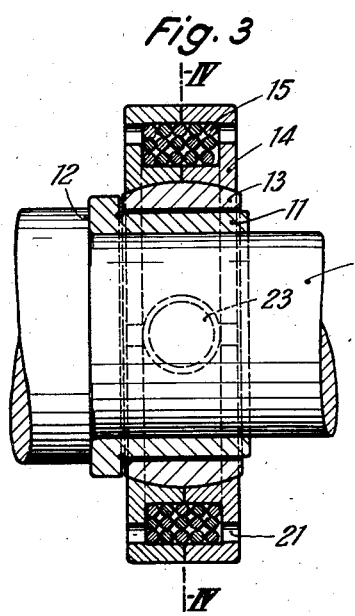
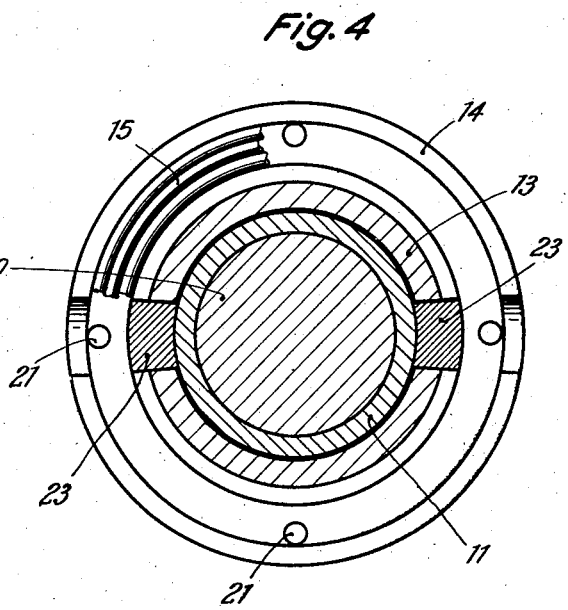

Jan. 1, 1935.   G. BÜHLER   1,986,040
PLAIN BEARING
Filed April 20, 1932   3 Sheets-Sheet 3

G. Bühler
INVENTOR

Patented Jan. 1, 1935

1,986,040

UNITED STATES PATENT OFFICE 1,986,040

PLAIN BEARING

Georg Bühler, Vienna, Austria

Application April 20, 1932, Serial No. 606,439
In Germany April 22, 1931

1 Claim. (Cl. 308—132)

My invention relates to plain bearings, i. e. bearings without antifriction members such as balls or rollers.

It is an object of my invention to provide a plain bearing as a substitute for antifriction bearings.

Such substitution is desirable particularly in cases in which the inevitable noise of antifriction bearings must be avoided.

Plain bearings as designed heretofore could not be used as substitutes for antifriction bearings because they could not be made as small as antifriction bearings of the same capacity, and so the antifriction bearing was superior wherever size is the determining factor. This inferiority of plain bearings, however, exists no longer as recently alloys, and particularly bronzes, have been prepared which stand so high a load per unit of area that they permit reducing the size, and particularly the length, of plain bearings to that of antifriction bearings. Such an alloy is disclosed in my copending application, Ser. No. 621,299.

It is the principal object of my invention to provide a plain bearing which is not larger than an antifriction bearing of equal capacity.

To this end I provide, in combination with a journal, annular members arranged co-axially with respect to the journal in such manner that the overall size of the plain bearing is equal to that of an antifriction bearing of equal capacity.

The equality of size not only as to length but also as to the other dimensions of the plain bearing according to my invention, permits employing my plain bearings where antifriction bearings had already been built in.

It is another object of my invention to provide a particularly simple and reliable lubrication which requires no attention, the same as in the antifriction bearings of the usual type.

To this end, I provide an annular oil pad on one of the annular co-axially arranged members. Oil is admitted to the journal through a recess in the co-axial member, or members, which is, or are, interposed between the pad and the journal.

It is another object of my invention to effect a circulation of the oil from the bearing and back to the bearing. To this end, I provide an oil well and so arrange the pad that it returns to the bearing the oil from the well. For instance, the pad may be immersed in the well.

It is another object of my invention to facilitate the exchanging of an antifriction bearing for a plain bearing according to my invention.

To this end, I design my plain bearing as a self-contained unit which, like the existing antifriction bearings, is adapted to be built into a suitable body or the like. The co-axial annular members of my bearings correspond to the races, and the pad corresponds to the balls or rollers, of an antifriction bearing.

It is another object of my invention to so design my plain bearing that it may yield to the deflections of the journal from the straight axial position under bending stress.

To this end, I equip not less than two of the annular members with interengaging spherical faces so that they are free to turn with respect to each other so that local pressure at the edges is avoided which might occur if the bearing had exclusively parallel faces.

In the accompanying drawings, three types of plain bearings embodying my invention are illustrated by way of example.

In the drawings

Fig. 1 is an axial section, and

Figure 6:
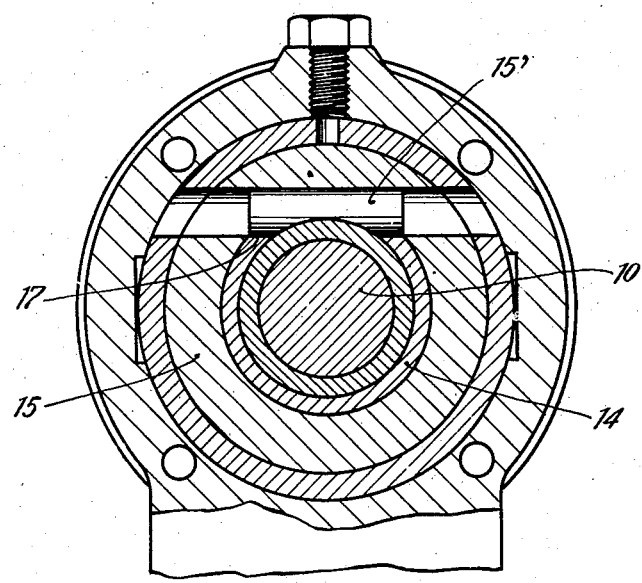

Fig. 2 is a section on the line II—II in Fig. 1, of the first type, with parallel interengaging faces of its members, Fig. 3 is an axial section, and Fig. 4 is a section on the line IV—IV in Fig. 3, of the second type, with spherical interengaging faces, Fig. 5 is an axial section, and Fig. 6 is a section on the line VI—VI in Fig. 5, of the third type, with an oil pad including two parts of different density.

Referring now to the drawings, 16 is the body of the bearing, 33 is an oil well in the body, 10 is the journal, and 11 is a bush, preferably of hardened steel, on the journal 10. 12 is a shoulder against which the inner end of the bush is abutted, 13 is a sleeve in which the bush 11 is mounted to rotate, 14 is a pad holder on the sleeve, and 15 is an annular pad on the holder. The bush 11, the sleeve 13 and the pad holder 14 are all arranged co-axially with respect to each other and to the journal 10, and the bearing is of the same overall size as an antifriction bearing of equal capacity. As mentioned, the small size, and particularly the shortness of the bearing, are obtained by making the sleeve 13 of very high-class material, such as drawn phosphor bronze.

The plain bearing is a self-contained unit and may be built in as such instead of an antifriction bearing.

In the types illustrated in Figs. 1, 2 and 5, 6, the pad holder 14 is a channel section, and in Figs. 1, 2 it is placed on the sleeve 13 with its web, while in Figs. 5, 6 it is placed on the sleeve with one of its flanges.

In Figs. 1, 2, the flanges of the pad holder engage the pad 15 with their sides while with their edges they bear on the body 16, transmitting radial pressure to it. The body 16 may be designed as desired, provided it has room for building in the plain bearing.

The sleeve 13 and the pad holder 14 are cut away down to the bush 11 at 17, Fig. 2, and 18 is a spring, with a perforated washer 28, which exerts radial pressure on the pad 15, forcing it into the cut-away portion 17. The spring 18 is inserted in a bore of the body 16 and is equipped with a threaded plug 22 for regulating its pressure. The plug is here equipped with a check valve 29 and a spring 30 for filling the bearing with oil. The oil is absorbed by the pad 15 by capillarity. Preferably the pad is made of felt or similar material so that it filters the oil while conveying it.

The oil is applied to the bush 11 by the pad 15, distributed over the bush 11 and allowed to trickle down into the oil well 33, as indicated by the arrows in Fig. 1. The outer wall of the well 33 is a flange on the bearing body 16, and its outer wall is a cap or disc 20. 21 are ports at the lower side of the flanges of the pad holder 14. The oil from the well 33 flows to the pad 15 through the ports, and in this manner the oil is circulated and filtered by the pad 15.

Referring now to Figs. 3 and 4, the body 16 is omitted here. The outer face of sleeve 13 is spherical and convex, and the inner face of the pad holder 14 is concave to fit it. By these means the bearing may adapt itself to the deflections of the journal 10. Preferably, the two parts are spherical throughout their length.

In this type, the pad holder 14 is divided at right angles to the axis of the bearing, and its members are channel sections making up together a rectangular-sectional annular chamber. This has the advantages that the pad 15 (here shown as built up from wicks) is better protected and that the area on which the pad holder engages the block or body of the bearing, becomes larger, reducing the pressure per unit of area and permitting higher loads to be carried. The building-in of the self-contained bearing unit is facilitated as falling out of the pad 15 is prevented by housing it in the chamber.

Oil from the well 33 is admitted to the chamber through holes 21. In the present instance, the pad holder and the sleeve 11 are cut away at two diametrally opposite points and plugs 23 of felt or other porous material are inserted in the cut-away portions. Two cut-away portions are provided because one of them must be relieved of the load on the bearing but obviously more than two may be provided.

The oil is circulated as described. The wicks making up the pad 15 are threaded into the chamber of the pad holder 14 by means of a wire hook or the like. However, the pad may also be inserted in one half of the pad holder 14 whereupon the holder is assembled.

The two parts of the pad holder may be permanently or detachably connected, for instance, by welding, or the two parts of the pad holder may be a single casting.

I claim:

In a bearing, the combination of a housing with a shaft extending therethrough, said housing including an oil well in its lower part, a sleeve of hard steel fixed on the shaft within the housing, a bushing of bearing metal in which is journaled the sleeve, a bearing box seated in the housing and in which is held the bushing of bearing material, said bearing box having an annular recess extending around its periphery with ports providing communications between the lower part of the annular recess and the oil well in the lower part of the housing, said bearing box and said bushing having alined passages in their upper parts leading from the annular recess to the bearing surfaces of the fixed sleeve, a pad of absorbing material enclosed in the annular recess of the bearing box to convey the oil entering the recess through the ports to the upper part of said recess, and means for pressing said pad through said passages onto the fixed sleeve to lubricate the wearing surfaces of the fixed sleeve and the bushing of bearing material, the oil leaving the said mutually contacting surfaces at their outer ends and falling into said well.

GEORG BÜHLER.